Figure 1:
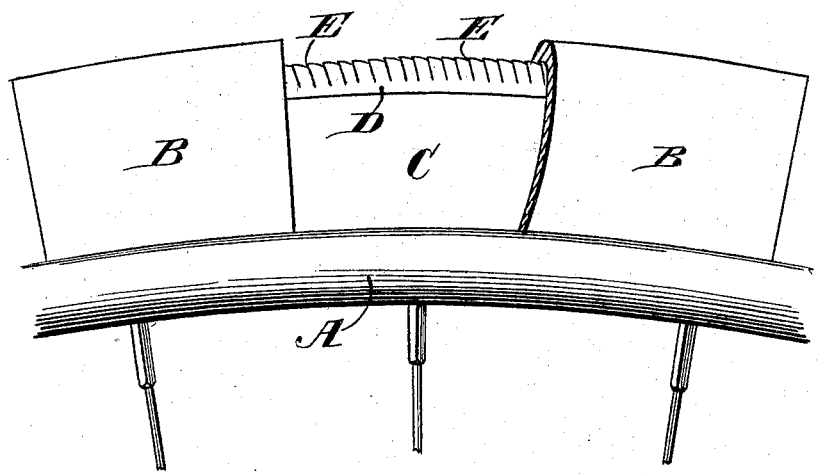

No. 611,553. Patented Sept. 27, 1898.
H. BANCROFT.
PNEUMATIC TIRE FOR VEHICLES.
(Application filed Apr. 29, 1898.)

(No Model.)

Witnesses.
Robert Everett,
F. W. B. Keefe

Inventor.
Henry Bancroft.
By James L. Norris.
Atty.

THE NORRIS PETERS CO., PHOTO-LITHO., WASHINGTON, D. C.

UNITED STATES PATENT OFFICE.

HENRY BANCROFT, OF CHURCH, ENGLAND.

PNEUMATIC TIRE FOR VEHICLES.

SPECIFICATION forming part of Letters Patent No. 611,553, dated September 27, 1898.

Application filed April 29, 1898. Serial No. 679,232. (No model.)

*To all whom it may concern:*

Be it known that I, HENRY BANCROFT, clogger, a subject of the Queen of Great Britain, residing at 70 Market street, Church, near Accrington, England, have invented certain new and useful Improvements in Pneumatic Tires for Cycles, Motor-Cars, and other Vehicles, of which the following is a specification.

This invention relates to certain improvements in pneumatic tires for cycles, motor-cars, and other vehicles; and it consists in providing the inner tube of the pneumatic tire with a piece or band of leather, rubber, or other flexible material of a length sufficient to completely encircle the air-tube along the tread portion thereof, and also in cutting the said piece or band of leather or like material with a series of slits along the entire face thereof at close intervals, so that the leather while being of a sufficient thickness to absolutely prevent puncture, nevertheless by being cut or incised, as aforesaid, does not interfere with the resiliency of the tire.

The slitting or cutting of the piece or band of leather or like material constitutes the essential and all-important feature of my invention.

I am perfectly aware that innumerable attempts have been previously made to prevent puncture by the introduction of bands of "unpuncturable material" (so called) between the air-tube and the outer cover; but such attempts, as is well known, have been unsuccessful on account of either interfering with the resiliency of the tire or otherwise the band introduced has been so thin that it has been practically useless for the purpose intended. The band being slit or cut with a number of incisions, as aforesaid, presents a front of thick and strong material perfectly invulnerable to puncture and yet impairing none of the elastic properties of the tire.

The band is preferably in the shape of the segment of a circle in cross-section, so as to bed to the air-tube, to which it may be cemented or otherwise secured. The cuts or incisions are preferably made sloping all one way, so as to close in the direction of the movement of the wheel when the machine or vehicle is in use. The band of leather or like material may be cut on one or both sides, and in the latter case the cuts may be made to cross each other, so as to leave a solid portion in the center. The slits may be made in the leather of equal or unequal depth or equal or unequal distance apart; but in all cases sufficient cuts must be made to obtain the desired flexibility, which is the all-important factor in non-puncturable devices. The slits or cuts by closing on one another when in contact with the ground present a solid front, by which means I obtain a comparatively thick band of stout and tough material defying puncture as well as possessing resilient properties. The band or piece of leather slit as described is fixed to the tread portion of the inner tube by cement or otherwise with the flat side in contact with the said tube, the arched portion thereof being face to face with the canvas lining of the outer cover.

In a modification the air-tube may be thickened at the tread during manufacture and afterward slit in the manner hereinbefore set forth.

Figure 2:
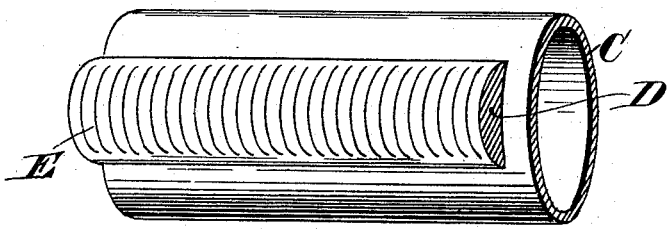

In the accompanying drawings, Figure 1 is a detached view of a bicycle-rim having a pneumatic tire attached, with a section of the outer cover removed so as to expose the inner air-tube and reveal my improved puncture-stopping device. Fig. 2 is a section of the inner tube with my improved puncture-proof band affixed.

Referring to Fig. 1, A is the rim; B, the outer cover of the pneumatic tire, having a section thereof removed so as to expose inner air-tube C, to which is fixed by cement or otherwise my improved puncture-proof band of leather or other material D, which is arranged to completely encircle the tread of the inner tube C, in which is cut a series of sloping cuts, slits, or incisions E at short intervals, so as to greatly increase the flexibility of the band and yet maintain its original thickness, and consequently its puncture-resisting properties.

The thickness of the band and the depth of the incisions are slightly exaggerated in the drawings, so as to give a clearer conception of the device.

In Fig. 2 the air-tube is shown in section, with a plan view of my improved puncture-resisting band D cut with slits E at close intervals and preferably taking the form of a segment of a circle in cross-section. The band may also be cut with slits on its under or flat side, the said cuts crossing those above without intersecting, thus leaving a solid central portion between.

I claim—

In pneumatic tires, the combination with an inner air-tube and an inclosing tube, of an interposed strip of leather, segment-shaped in cross-section, encircling said air-tube along its tread portion and having its concave side secured to said air-tube, said strip having its outer convex side provided throughout its length with transverse sloping, or inclined, slits, or incisions, whereby to afford the proper resiliency, and whereby, in practice, said slits will close in the direction of movement of the wheel and present a solid, non-puncturable surface, substantially as described.

In testimony whereof I, HENRY BANCROFT, have hereunto set my hand in presence of two subscribing witnesses.

HENRY BANCROFT.

Witnesses:
F. RICHMOND,
JOS. COMSTINE.